US006667474B1

(12) United States Patent
Abramson et al.

(10) Patent No.: US 6,667,474 B1
(45) Date of Patent: Dec. 23, 2003

(54) CAPILLARY TUBE ASSEMBLY WITH REPLACEABLE CAPILLARY TUBE

(75) Inventors: Jeffrey B. Abramson, Scotts Valley, CA (US); Nigel P. Gore, San Jose, CA (US); Mukul Khosla, San Jose, CA (US); Iain C. Mylchreest, Gilroy, CA (US); Keqi Tang, Richland, WA (US); Eric B. Johnson, San Rafael, CA (US)

(73) Assignee: Thermo Finnigan LLC, San Jose, CA (US)

(*) Notice: Subject to any disclaimer, the term of this patent is extended or adjusted under 35 U.S.C. 154(b) by 254 days.

(21) Appl. No.: 09/699,141

(22) Filed: Oct. 27, 2000

(51) Int. Cl.[7] .......................... B01D 59/44; H01J 49/00

(52) U.S. Cl. ....................................... 250/288; 210/634

(58) Field of Search ........................... 250/288; 210/634

(56) References Cited

U.S. PATENT DOCUMENTS

| | | | | |
|---|---|---|---|---|
| 3,867,631 A | | 2/1975 | Briggs et al. | 250/281 |
| 4,977,320 A | | 12/1990 | Chowdhury et al. | 250/288 |
| 5,289,003 A | | 2/1994 | Musser | 250/288 |
| 5,304,798 A | | 4/1994 | Tomany et al. | 250/288 |
| 5,416,322 A | | 5/1995 | Chace et al. | 250/288 |
| 5,690,828 A | * | 11/1997 | Clay et al. | 210/634 |
| 5,736,741 A | | 4/1998 | Bertsch et al. | 250/288 |
| 5,756,995 A | * | 5/1998 | Maswadeh et al. | 250/288 |
| 5,965,883 A | | 10/1999 | Lee et al. | 250/288 |

FOREIGN PATENT DOCUMENTS

| | | | |
|---|---|---|---|
| JP | 1146242 A | 6/1989 | H01J/27/02 |
| WO | WO85/02490 | 6/1985 | H01J/49/04 |

* cited by examiner

*Primary Examiner*—John R. Lee
*Assistant Examiner*—Erin-Michael Gill
(74) *Attorney, Agent, or Firm*—Dorsey & Whitney LLP

(57) ABSTRACT

The present invention relates to a heated capillary assembly which connects an atmospheric pressure ionization source to a lower pressure mass analyzing system which comprises a capillary tube removably secured to, and extending through the bore of a capillary support assembly.

16 Claims, 3 Drawing Sheets

CAPILLARY TUBE ASSEMBLY WITH REPLACEABLE CAPILLARY TUBE

BRIEF DESCRIPTION OF THE INVENTION

This invention relates generally to a capillary tube assembly which connects an atmospheric pressure ionization chamber to a lower pressure mass analyzer assembly, and more particularly to a capillary assembly having a removable capillary tube.

BACKGROUND OF THE INVENTION

When an atmospheric pressure ionization (API) source such as an electrospray (ES) or atmospheric pressure ionization (APCI) source is installed on a mass spectrometer system, the gas flow from the atmospheric pressure ionization chamber into the vacuum system of the mass spectrometer must be set to match the pumping capacity of the vacuum pumps used. Small diameter orifices and capillary tubes are the two methods most often used to limit the gas flow from the atmospheric pressure spray chamber into the vacuum system of the mass spectrometer. These capillary tubes are often heated to provide thermal energy to the solvated ions passing through them, thus desolvating these ions.

Non-volatile material from the samples being analyzed by the mass spectrometer system can accumulate at the entrance or on the inner bore of these capillary tubes. These non-volatile materials can be salts from the liquid mobile phase being sprayed into the atmospheric pressure ionization source. They can also be proteins, lipids or salts, remaining in the sample solution after extraction from biological fluids such as plasma or urine. The accumulation of non-volatile material on these capillary tubes can lead to a reduced transfer of ions and reduction of signal. This requires the user to clean the capillary tube or replace it with a new one. Capillary tube maintenance or replacement typically occurs every several months for complex samples, and yearly for clean samples. Whatever the frequency of maintenance, the fact remains that the system is vented. The time for maintenance and bringing the mass spectrometer system back online takes approximately one day. This means a low sample throughput which translates into loss of revenue for a laboratory.

OBJECTS AND SUMMARY OF THE INVENTION

It is an object of the present invention to provide a heated capillary assembly in which the capillary tube can be easily and quickly removed from its heater for inspection, cleaning and replacement.

It is another object of the present invention to provide a heated capillary tube assembly with a replaceable capillary tube in which venting of the mass analyzer system is restricted during capillary tube removal and replacement.

These and other objects of the invention are achieved by a system in which an atmospheric pressure ionization chamber is connected to a lower pressure region of a mass analyzer via a capillary tube assembly having a removable capillary tube and to a system which inhibits venting of the lower pressure region during removal and replacement of the capillary tube.

BRIEF DESCRIPTION OF THE DRAWINGS

The foregoing and other objects of the invention will be more clearly understood from the following detailed description when read in conjunction with the accompanying drawings in which.

DESCRIPTION OF PREFERRED EMBODIMENT(S)

Figure 1:
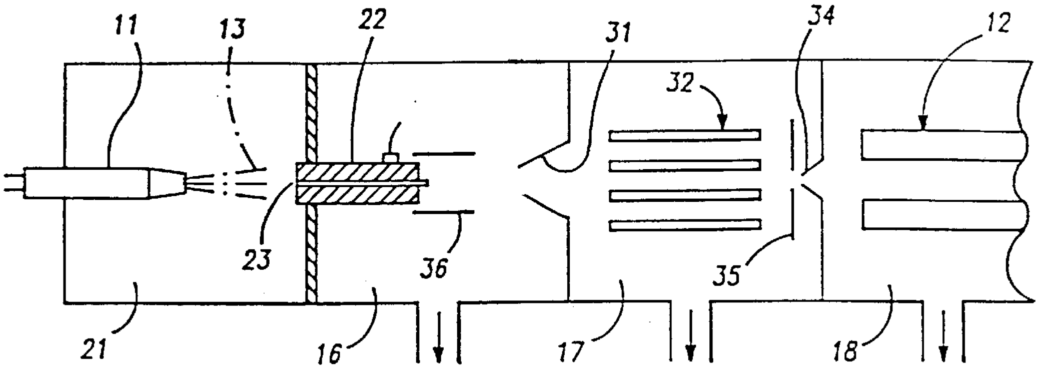
(PRIOR ART) FIG.—1
FIG. 1 shows an API probe coupled to a mass spectrometer via a capillary tube assembly in accordance with the prior art.

Referring to FIG. 1, a prior art mass spectrometer with an ionization source having probe 11 is illustrated coupled to a mass analyzer 12 by an ion transmission assembly. It is apparent to one skilled in the art that the ion source can be operated at pressures ranging from below atmospheric pressure to above atmospheric pressure. Although a quadrupole mass analyzer 12 is illustrated, it will be apparent to those skilled in the art that the mass analyzer may include, and is not limited to, time of flight (TOF), quadrupole, Fourier transform (FTMS), ion trap, magnetic sector or hybrid mass analyzers. By way of example, the ion source may be an atmospheric pressure ion source (API). More particularly, the ion source may comprise an electrospray ion source (ES) or atmospheric pressure chemical ionization source (APCI). In any event, the source includes an ion probe 11 which forms an ion spray 13. The ionization mechanism involves the desorption at atmospheric pressure of ions from the fine electrically-charged particles formed by the ES or APCI probe.

The sample liquid may be delivered to the probe 11 by, but is not limited to, liquid chromatography pumps, syringe pumps, gravity-feed vessels, pressurized vessels and/or aspiration-feed vessels. Samples may also be introduced using auto injectors, separation systems such as liquid chromatography or capillary electrophoresis, capillary electrophoresis chromatography and/or manual injection valves connected to the API probe.

The ion transmission assembly includes successive chambers 16, 17 and 18, maintained at successively lower pressures with the mass analyzer 12 in the lowest pressure chamber. The first chamber 16 communicates with the atmospheric pressure ionization chamber 21 via a capillary tube 22. Due to the potential at the end of the capillary tube, ions are caused to travel to the capillary tube where the difference in pressure between the chambers 16 and 21 cause ions and gases to enter the orifice 23 of the capillary tube and flow through the capillary passage into the chamber 16. The other end of the capillary is opposite a skimmer 31 which separates the chamber 16 from the chamber 17 which houses an ion guiding octopole lens assembly 32. A tube lens 36, as described in U.S. Pat. No. 5,157,266 cooperates with the end of the capillary to force ions into the center of the expanding ion flow which leaves the capillary and travels toward the skimmer 31. The octopole lens assembly 32 is followed by ion optics which may comprise a second skimmer 34 and lens 35 which direct ions into the analyzing chamber 18 and into a suitable mass analyzer 12. The combination of capillary tube 22, skimmer 31, lens 32, skimmer 34 and lens 35 form the ion transmission assembly. Although a particular ion transmission system is described, ions from the capillary can be guided into a mass analyzer by other ion guiding systems.

As discussed above, non-volatile materials from the sample can accumulate at the entrance or the inner bore of the capillary tube. These non-volatile materials can be salts from the liquid mobile phase being sprayed into the atmospheric pressure chamber 21. They can also be proteins, lipids or salts remaining in the sample solution after extraction from biological fluids such as plasma or urine. The accumulation of these non-volatile materials on or in the capillary tube can lead to reduced signal, which requires the user to clean the capillary tube or replace it with a new one.

In accordance with the present invention, there is provided a capillary tube assembly, for example a heated capillary tube assembly, which connects the source chamber 21 to the lower pressure region of a mass spectrometer such as the region 16, FIG. 1. The capillary tube assembly is constructed such that the capillary tube may be easily removed from its mount for inspection, cleaning or replacing, and then reinserted in an aligned position into the assembly. This can be accomplished with minimum venting of the lower pressure regions thereby considerably reducing the down time of the mass spectrometer system, and increasing the daily throughput.

Figure 2:
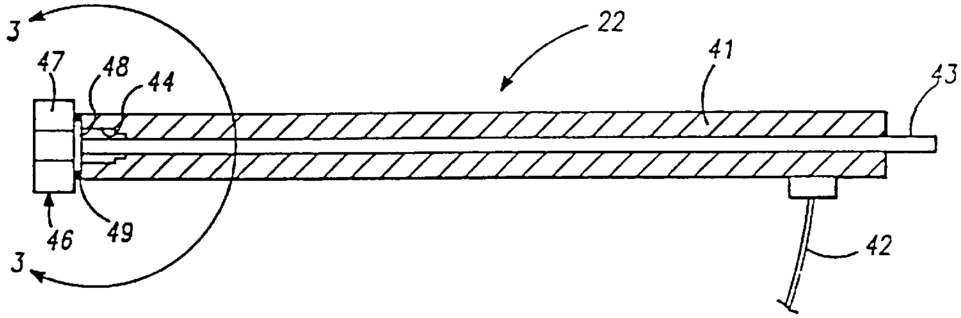
FIG. 2 shows a capillary assembly in accordance with one embodiment of the present invention.
Figure 3:
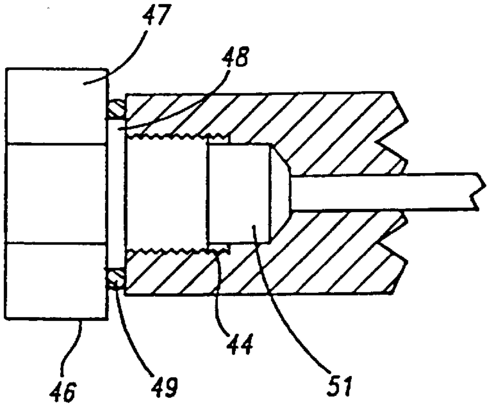
FIG. 3 is an enlarged view of the region 3—3 of FIG. 2.

Referring to FIGS. 2 and 3, a heated capillary tube assembly 22 is illustrated. The capillary tube assembly includes a cylindrical heater 41 which is electrically heated via the heater wire 42. A capillary tube 43 extends axially through the heater. The end of the heater includes a threaded bore portion 44 which receives the cooperating threads of the nut 46. More particularly, the nut includes a head which has wrench flats 47 to allow a tool to loosen or tighten the nut. A shoulder 48 which abuts against the mating face of the capillary heater precisely determines the distance between the nut and heater, and thus the amount of compression of the sealing o-ring 49. A compressible fitting 51 is compressed by the nut and urged against a capillary tube and heater to form a seal. Thus, the capillary can be easily removed by unthreading the nut and sliding the capillary along the axial bore of the heater assembly for removal and inspection or replacement. The capillary tube may, for example, be a steel capillary tube which slides into the mating bore of the heater body. The heater body is preferably made of a different metal such as an aluminum or bronze alloy to prevent the capillary tube and heater body from galling or seizing. The threads on the nut may be plated with a different metal such as silver or nickel to prevent galling of the threads to the heater body. Although a steel capillary tube has been described, the tube may be titanium, nickel, coated or lined e.g. glass lined, glass or other type of capillary tube known in the art. Although a heater body has been described for heating the capillary, the capillary tube may be directly resistively heated by applying a current along the tube which is mounted in a cylindrical body.

Figure 4:
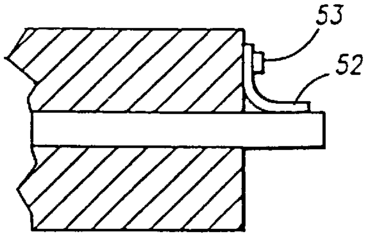
FIG. 4 is an enlarged view of the end portion of a capillary tube assembly including a flap for inhibiting venting of the mass analyzer system.

Referring to FIG. 4, the end of the heater assembly may be provided with a flap or seal 52 secured to the heater assembly by, for example, a screw 53, the flap being made of a resilient material so that when the capillary tube is withdrawn the flap closes the opening at the end of the heater assembly, thereby minimizing venting of high pressure gases into the low pressure adjacent chamber.

Figure 5:
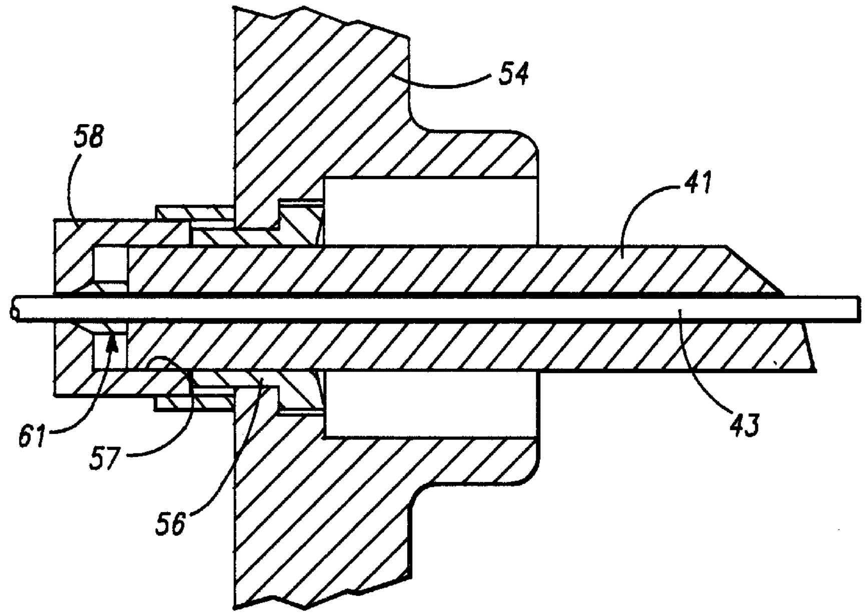
FIG. 5 is a partial view of the input end of a capillary assembly in accordance with another embodiment of the invention.

Referring to FIG. 5, another embodiment of the invention is illustrated. The body 41 is supported by the wall 54 between the atmospheric pressure chamber and the lower pressure chamber by a sleeve 56. The end of the body is provided with an external thread 57 which is adapted to receive a nut 58. The capillary tube 43 is inserted axially into the body 41. A compression fitting or ferrule 61 slides over the capillary, and the inclined surfaces of the ferrule and nut cooperate to compress the ferrule against the capillary tube to seal the tube to provide a seal for the capillary tube. The capillary tube is removed and replaced by unthreading the nut 58, sliding the capillary out of the body, and then re-inserting the cleaned capillary tube or a replacement capillary tube and tightening the nut.

Figure 6:
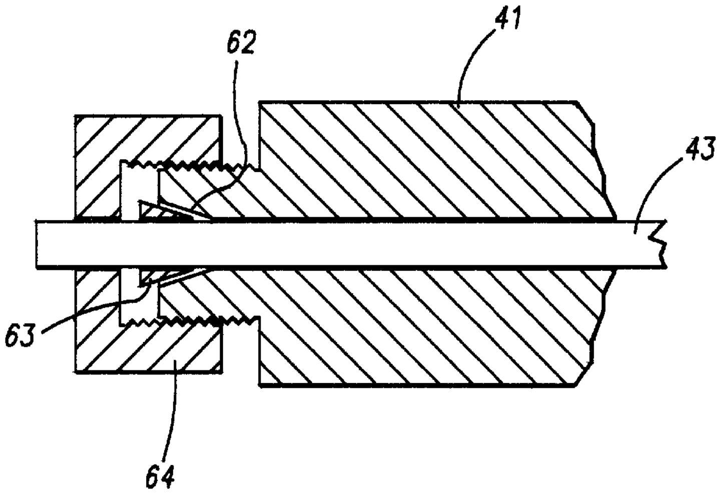
FIG. 6 is an enlarged view of the capillary assembly in accordance with still another embodiment of the invention.

FIG. 6 shows an alternate sealing assembly in which the interior bore of the heater body 41 is inclined 62 to receive the compressible sealing ring or ferrule 63 which is compressed against the capillary by tightening the nut 64.

Figure 7:
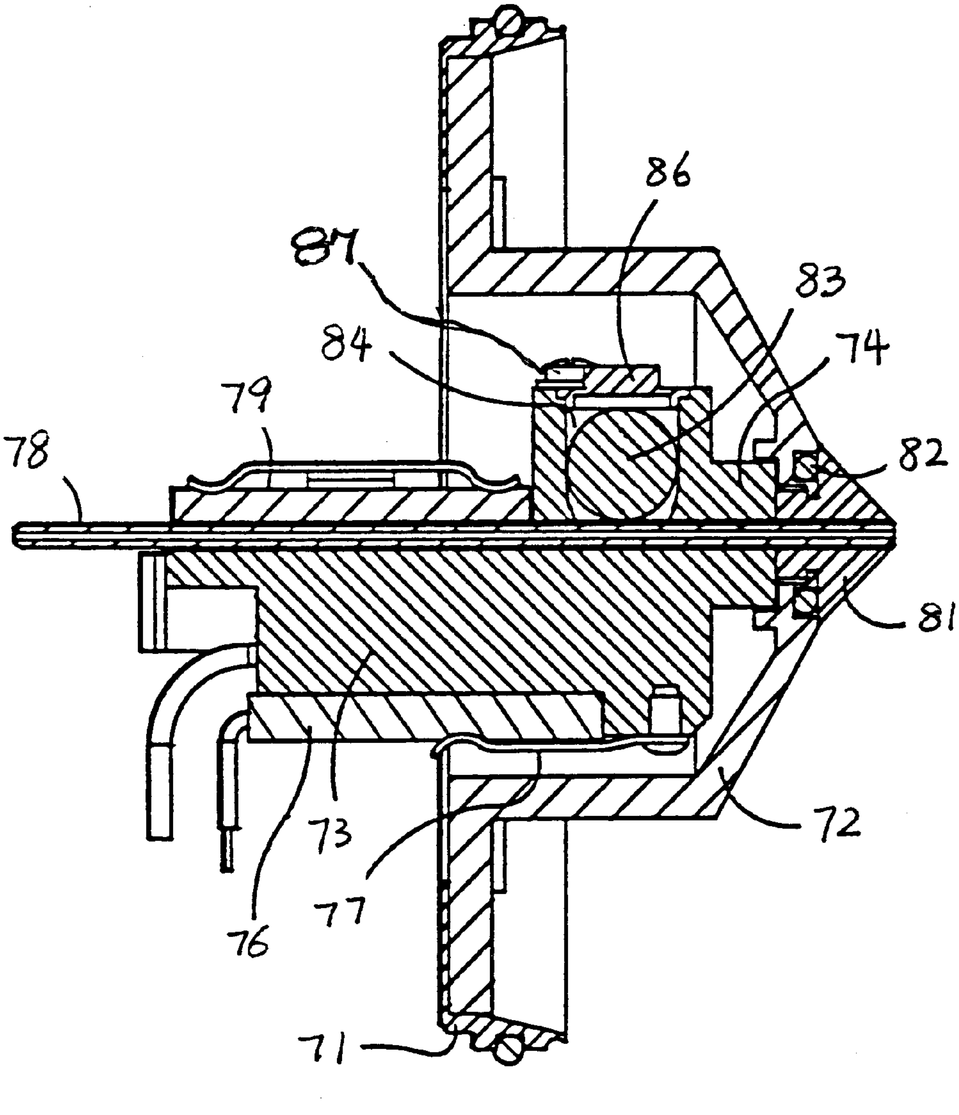
FIG. 7 is an enlarged view of a capillary assembly in accordance with a further embodiment of the present invention.

FIG. 7 shows another embodiment of the invention in which a wall 71 and shield 72 support a heated capillary assembly. The heater body 73 has one end 74 supported by the shield 72 and its central portion supported by the wall 71. A temperature sensor 76 is held against the heater body by spring 77. The heater body receives a capillary tube 78. The capillary tube is pressed against the heater body by a spring assembly 79. The end of the capillary tube is secured to a nut or fitting 81 having external threads which are received by the internal threads at the end of the heater 71. Thus, the capillary tube with its integral fitting 81 is screwed into the heater body and compresses an o-ring 82 to provide a seal. The heater assembly includes a sealing ball 83 which is retained in a well 84 formed in the heater assembly by a spring-loaded fitting 86 secured to the heater by screws 87. Thus, as the capillary tube is removed, the ball 83 seals the bore of the heater preventing venting of the lower pressure chamber.

Although several arrangements for securing the capillary to the end of a support assembly or a heated assembly have been described, it is apparent that other attachments such as bayonet-type fittings or snap-on fittings may be used.

There has been provided a capillary tube assembly in which the capillary tube can be easily removed for cleaning or replacement.

The foregoing descriptions of specific embodiments of the present invention are presented for the purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed:

1. A mass spectrometer system comprising an ionization chamber and a lower pressure mass spectrometer system and a capillary tube assembly coupling said ionization chamber to said lower pressure mass spectrometer system to allow ions and gas to flow from the ionization chamber into the mass spectrometer system, characterized in that said capillary tube assembly includes:

a support assembly having an axial bore, a capillary tube extending through said axial bore and removable from the support assembly, and a securing assembly for sealably engaging and securing one end of said capillary tube to one end of the support assembly.

2. A mass spectrometer system as in claim 1 in which the support assembly is a heated support assembly.

3. A mass spectrometer system as in claim 1 in which the capillary tube is directly heated by passage of electrical current therealong.

4. A mass spectrometer system as in claim 1, 2 or 3 including means for inhibiting venting of said lower pressure mass spectrometer system when the capillary is removed from the support assembly bore.

5. A heated capillary tube assembly for connecting an ionization chamber to a lower pressure chamber in a mass analyzing system comprising:

a heated support assembly having an axial bore, a capillary tube extending through said axial bore and removable from the heated assembly, and a securing assembly for sealably engaging and securing one end of the capillary tube to one end of the heated support assembly.

6. A heated capillary tube assembly as in claim 5 including means for restricting the flow of gases through the bore of the heated support assembly from the ionization chamber to the lower pressure chamber when the capillary tube is removed.

7. A heated capillary tube assembly as in claim 6 in which said restricting means comprises a flap mounted on the other end of the heated support assembly.

8. A heated capillary tube assembly as in claim 6 in which said restricting means comprises a ball which falls into said heated support assembly bore when the capillary tube is removed.

9. A heated capillary tube assembly as in claim 5 in which said securing assembly comprises a nut threadably received by the one end of the heated support assembly.

10. A heated capillary tube assembly as in claim 9 including a sealing member between said nut and said heater assembly which is compressed against the capillary tube and heated support assembly when the nut is tightened.

11. A heated capillary tube assembly as in claim 10 in which said sealing member is a ferrule.

12. A heated capillary tube assembly as in claim 9 including an o-ring disposed between the nut and the one end of the heater assembly which is compressed against the heated support assembly and capillary tube when said nut is tightened to form a seal.

13. A mass spectrometer system as in claim 1 in which the support assembly and the capillary tube are electrically connected.

14. A heated capillary tube assembly as in claim 5 in which the support assembly and the capillary tube are electrically connected.

15. A mass spectrometer system as in claim 1, further comprising a spring assembly which presses the capillary tube against the support assembly.

16. A heated capillary tube assembly as in claim 5, further comprising a spring assembly which presses the capillary tube against the support assembly.

* * * * *

UNITED STATES PATENT AND TRADEMARK OFFICE

CERTIFICATE OF CORRECTION

PATENT NO. : 6,667,474 B1 Page 1 of 1
DATED : December 23, 2003
INVENTOR(S) : Abramson et al.

It is certified that error appears in the above-identified patent and that said Letters Patent is hereby corrected as shown below:

Column 1,
Lines 3 and 21, after "assembly" and before the period, insert:
-- , said securing assembly comprising a sealing means that seals the axial bore to inhibit venting of said lower pressure mass spectrometer system when the capillary tube is removed --

Signed and Sealed this

Fourth Day of January, 2005

JON W. DUDAS
*Director of the United States Patent and Trademark Office*